(12) United States Patent
Leduc

(10) Patent No.: US 8,632,176 B2
(45) Date of Patent: Jan. 21, 2014

(54) READING GLASSES WITH A BOOK COMPATIBLE TEMPLE AND HINGE COMBINATION

(76) Inventor: Janet Leduc, Ottawa (CA)

(*) Notice: Subject to any disclaimer, the term of this patent is extended or adjusted under 35 U.S.C. 154(b) by 232 days.

(21) Appl. No.: 13/210,933

(22) Filed: Aug. 16, 2011

(65) Prior Publication Data

US 2013/0044287 A1 Feb. 21, 2013

(51) Int. Cl.
*G02C 1/00* (2006.01)
(52) U.S. Cl.
USPC .......................................... 351/158; 351/111
(58) Field of Classification Search
USPC ................... 351/111, 118, 119, 158, 41, 153
See application file for complete search history.

(56) References Cited

U.S. PATENT DOCUMENTS 4,547,048 A * 10/1985 Negishi .......................... 351/137
5,875,016 A * 2/1999 Martin et al. .................... 351/41

* cited by examiner

*Primary Examiner* — Hung Dang
(74) *Attorney, Agent, or Firm* — Brian S. Steinberger; Law Offices of Brian S. Steinberger, P.A.

(57) ABSTRACT

Reading glasses are used as a book mark and are framed so that one temple is longer than the opposite temple. This offset permits one arm of the frame to be inserted into the pages of a book from above as a book mark. The elongated temple accommodates the thickness of the spine so that the lens frame sits flat against the spine. Friction between the pages of the book and the inserted arm keep the glasses in place and prevent them from being misplaced.

9 Claims, 6 Drawing Sheets

READING GLASSES WITH A BOOK COMPATIBLE TEMPLE AND HINGE COMBINATION

CROSS-REFERENCE TO RELATED APPLICATIONS

This application claims the benefit of U.S. Provisional Patent Application No. 61/370,007 filed on Aug. 2, 2010.

FIELD OF THE INVENTION

This invention relates to signals and indicators and particularly devices having means for indicating a particular leaf of a stack and specifically reading glasses with a book compatible temple and hinge combination.

FEDERAL SPONSORSHIP

NA

BACKGROUND

Reading glasses are worn by individuals with presbyopia. These individuals account for a growing percentage of adults who fall into the "boomer" cohort. As clearly described by the name, these corrective lenses are worn when reading. Since they are not worn full-time there is a tendency to misplace them. Furthermore, since reading glasses are available with very compact lenses and foldable frames, they can be easily hidden under newspapers, books and within general household clutter. One solution has been to purchase several pairs of reading glasses and leave them strategically positioned in home and office so that a pair is always at hand when required. This solution has its short-comings in that it requires additional expense and there is no guarantee that all pairs will not eventually be lost.

Therefore there is a need for reading glasses that are not so easily lost or misplaced.

SUMMARY OF THE INVENTION

It is an object of the present invention to provide a pair of reading glasses that will not be easily misplaced or lost.

It is a further objective of the present invention to provide a pair of reading glasses that is book compatible and so can be used a book mark.

Another objective of the invention is to provide a combination reading glass frame and book mark so that the pair of reading glasses will readily located with a book in progress by attachment thereto.

A further objective of the invention is to provide a pair of reading glasses having a temple and hinge that facilitate placement of the eyeglass frame over the spine of the book.

Yet another objective of the invention is to provide a frame for a pair of reading glasses that has a flattened arm to facilitate easy insertion between the pages of a book to mark a location and remain in place by compressive forces on the flattened arm when the book is closed.

One advantage of the invention is that the glasses will not be readily misplaced as they will be located at the point of use, namely, attached to the book in progress and marking the page of interest.

A further advantage of the invention is that an individual will save time and avoid frustration in trying to locate reading glasses.

Yet another advantage is that an individual can save money by not having to purchase several pairs of glasses.

In one embodiment of the invention there is provided reading glasses with a book compatible temple and hinge comprising a frame for a pair of corrective lenses, a first arm connected at a first side of the frame and comprising a first temple portion, a first hinge and a first end; a second arm connected to a second side of the frame and comprising a second temple portion, a second hinge and a second end. The first temple portion is longer than the second temple portion so that the first hinge is offset from the second hinge thereby is creating a space under the first temple portion for accommodating the spine of the book. The first arm has a first vertical portion and a second horizontal portion. The second horizontal portion comprises a front surface and a back surface in a frictional contact with respective adjacent pages of the book. The frictional contact prevents the reading glasses from falling out of the book and facilitates storing the reading glasses at a point of use. The first end of the first arm is flattened to permit easy insertion between the pages of a book.

BRIEF DESCRIPTIONS OF THE DRAWINGS

DETAILED DESCRIPTION OF THE INVENTION

Figure 1:
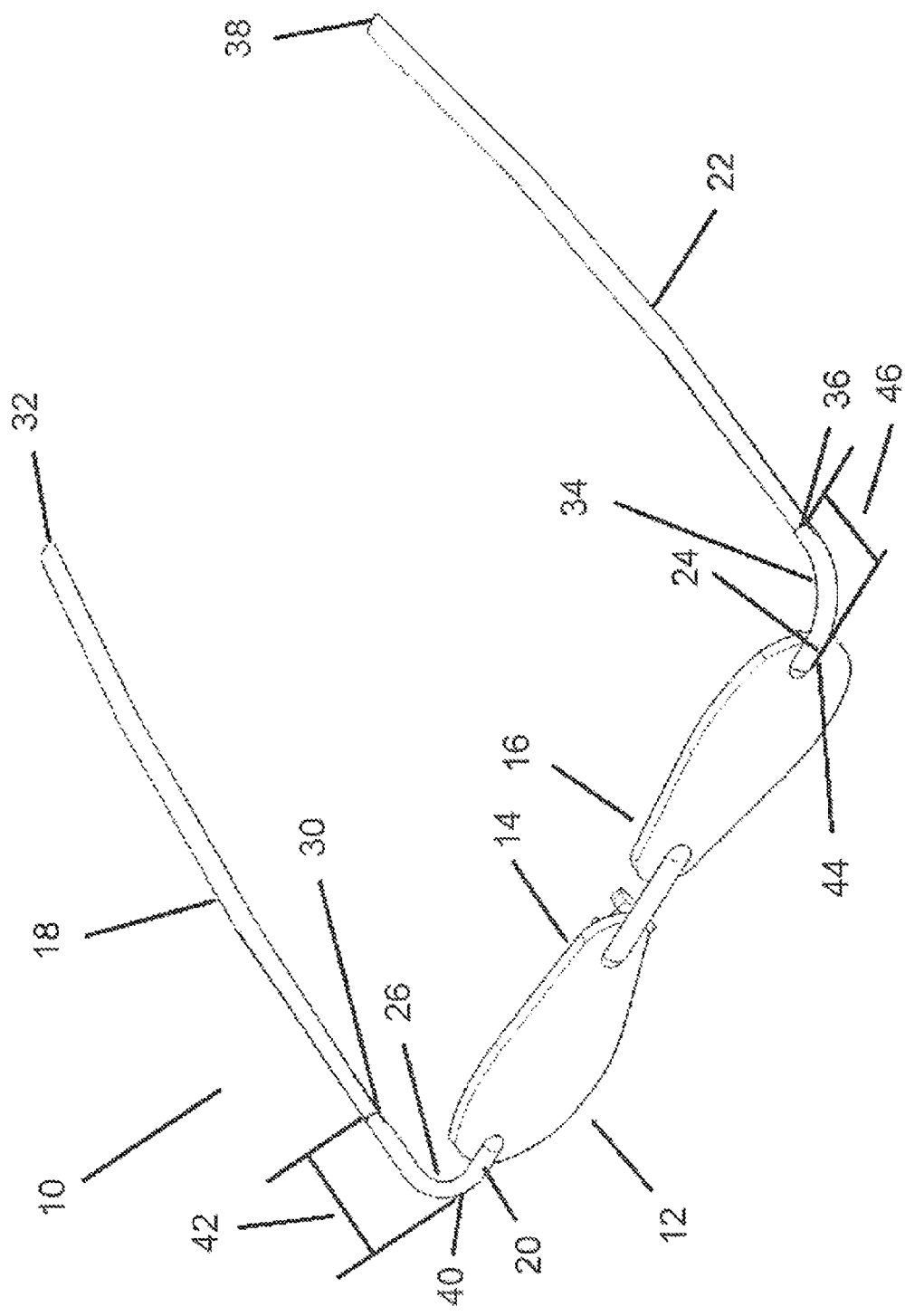
FIG. 1 is a top perspective view of one embodiment of the invention.

Referring to FIG. 1, there is shown a pair of reading glasses of one embodiment of the invention 10 in a front top perspective view with a book compatible temple and hinge. The reading glasses comprise a frame 12 for a pair of corrective lenses comprising a first lens 14 and a second lens 16. A first arm 18 connected at a first side 20 of the frame 12. A second arm 22 is connected at a second side 24 of the frame 12. The first arm 18 comprises a first temple portion 26, a first hinge 30 and a first end 32. The second arm 22 comprises a second temple portion 34, a second hinge 36 and a second end 38. The first hinge and the second hinge are spring hinges so that once the arms are in a folded configuration they will remain that way until a mild hand force overcomes the resilience of the spring to open the arms into their extended position. Measuring the first temple portion 26 from point 40 to the first hinge 30, the first temple portion has a length 42. Measuring the second temple portion 34 from point 44 to hinge 36 the second temple portion has a length 46.

Figure 2:
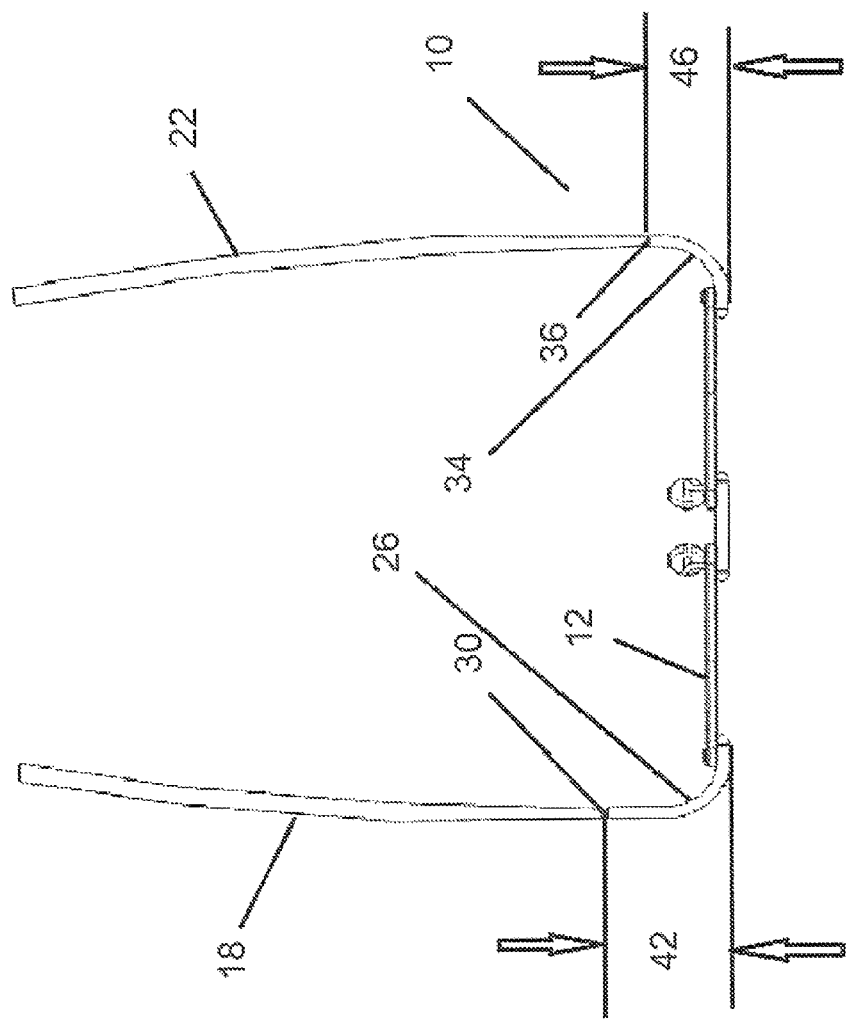
FIG. 2 is a plan view of one embodiment of the invention with arms extended.

Now referring to FIG. 2, there is shown a pair of reading glasses 10 in one embodiment of the invention in a plan view with arms extended. The pair of reading glasses comprises a frame 12, a first arm 18 and a second arm 22. Hinge 30 connects the first arm 18 to the first temple portion 26. Hinge 36 connects the second arm 22 to second temple portion 34. Length 42 is longer than length 46 thereby creating an off-set between the first hinge 30 and the second hinge 36.

Figure 3:
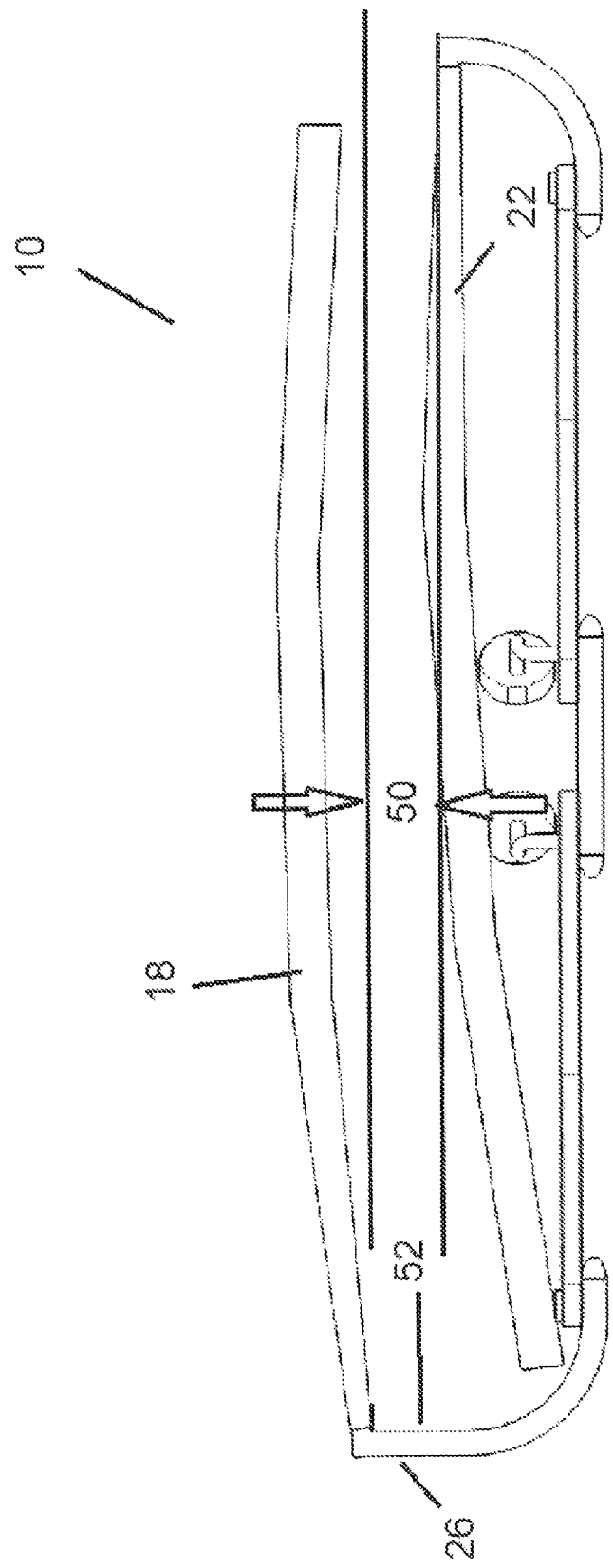
FIG. 3 is a plan view of one embodiment of the invention with arms in a folded configuration.

Referring to FIG. 3, there is shown a pair of reading glasses in one embodiment of the invention 10 with the arms 18 and 22 in a folded configuration. The off-set 50 between the length 42 and length 46 shown in FIG. 2, creates a space 52 under the first temple portion 26 for accommodating a spine of a book.

Figure 4:
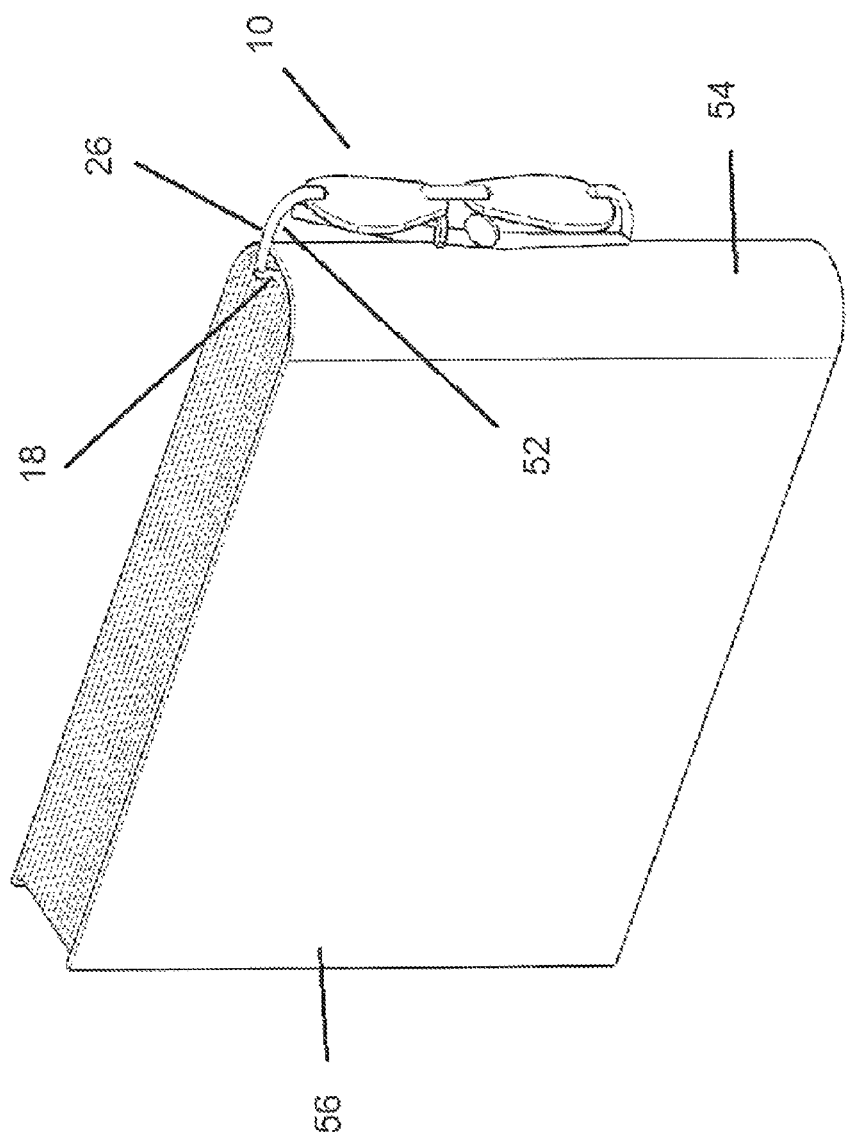
FIG. 4 is one view of the invention inserted into a book.

Referring now to FIG. 4 there is shown one embodiment 10 of the reading glasses of the invention in with arms folded and with arm 18 inserted behind the spine 54 of a book 56. Space 52 behind first temple portion 26 accommodates the spine 52 so that the reading glasses 10 act as a bookmark.

Referring back to FIG. 1, and arm end 32, this end is shaped in the form of a blade and is sharp enough to be inserted into a closed book with minimal hand force while at the same time not so sharp as to pose a cutting hazard to the user.

Figure 5:
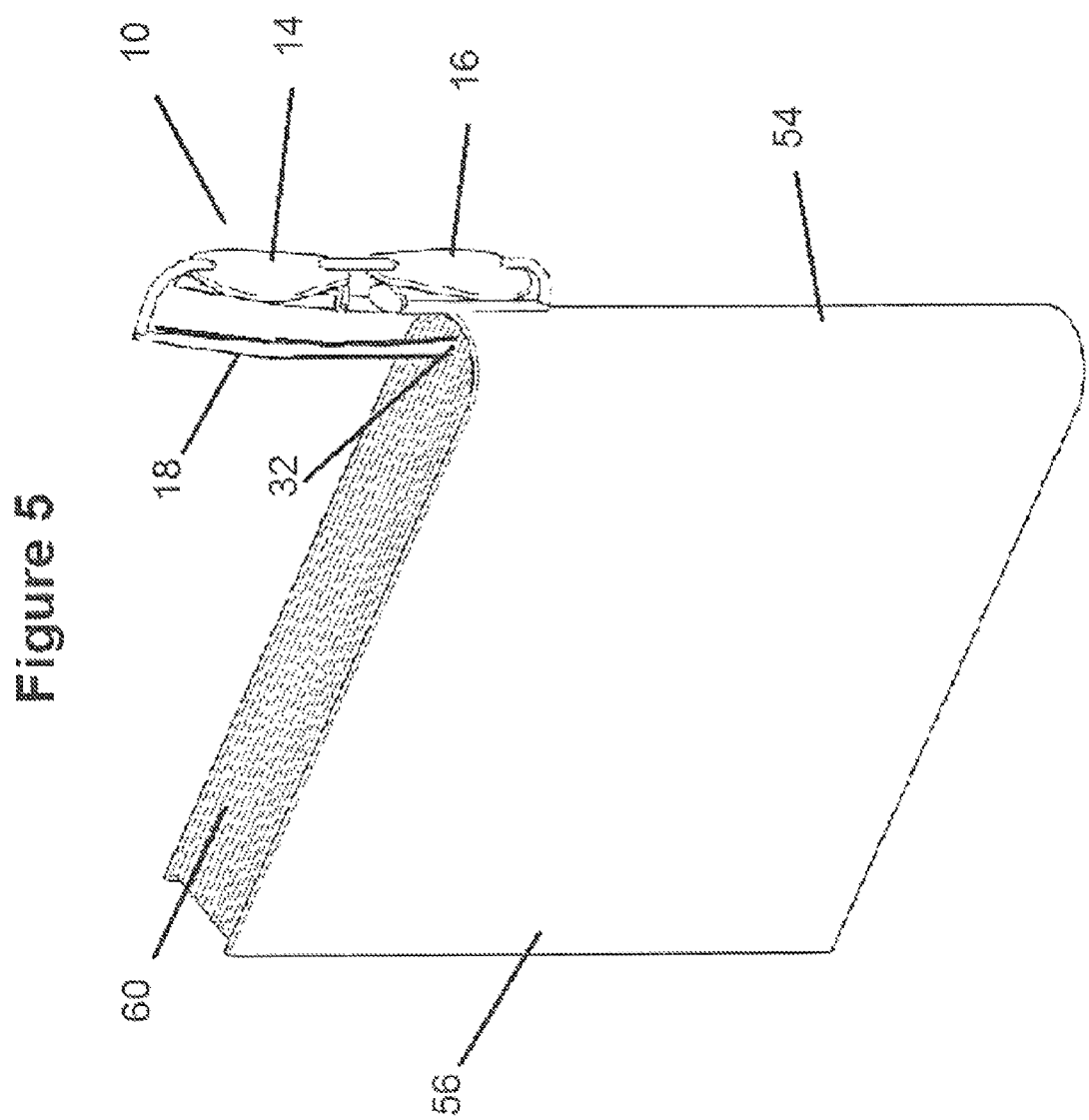
FIG. 5 is another view of the invention inserted into a book.

Referring to FIG. 5, arm end 32 is inserted into the pages 60 of a closed book 56. Alternatively, the book 54 may be closed on arm 18 for marking a specific location in the book. The lenses 14 and 16 are disposed on the back of the spine 52.

Figure 6:
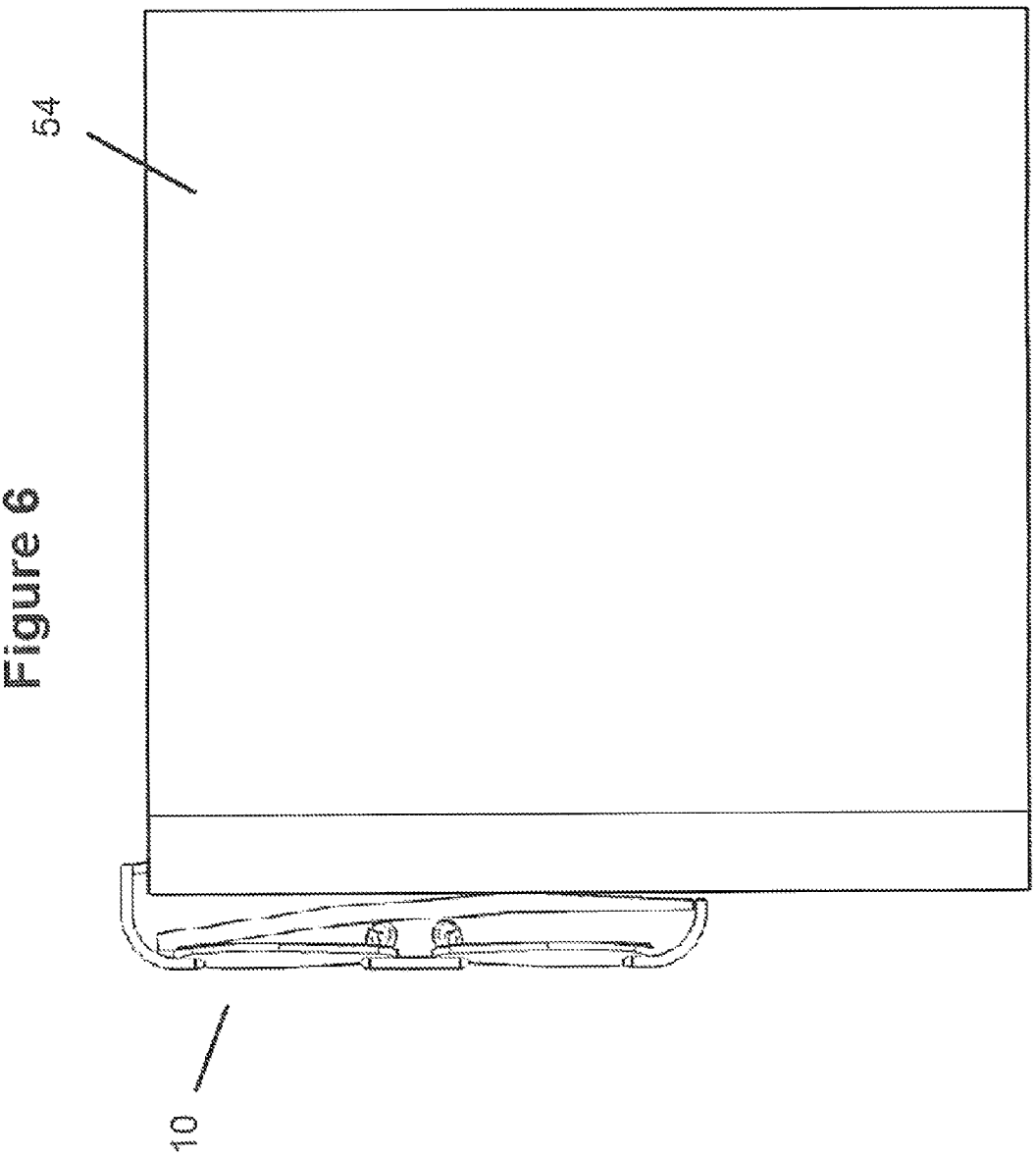
FIG. 6 is yet another view of the invention inserted into a book.

Referring to FIG. 6, the reading glasses 10 are shown in a folded configuration with arm 18 fully inserted into the pages of the book 54. The inserted arm 18 is kept in position by frictional forces between the sides of arm 18 and the pages of the book. If the book is laid on a table on its side then the arm 18 will maintain its position within the pages of the book by compression. The frame of the glasses is necessarily narrow so that the lenses of the glasses will remain adjacent to the spine without any portion of the lenses extending over the width of the spine. This prevents the weight of the book from acting on the frame or the lenses. As well, if the profile of the lenses remains within the area defined by the spine of the book then the reading glasses will not be dislodged from the book by accidentally pulling them away from the book by the frame.

One can see from the foregoing description and diagrams that the advantages of this invention are to prevent easy loss of reading glasses and to locate the reading glasses at a point of use such as a book by using the reading glasses as a book mark.

Although this invention has been described with a certain degree of detail, it is to be understood that the present disclosure is made by way of example only that that numerous changes could be made in the detailed construction of the invention without departing from the scope of the following claims.

What is claimed is:

1. Reading glasses with a book compatible temple and hinge combination comprising a frame for a pair of corrective lenses lying in a first plane and comprising a first lens and a second lens, a first arm connected at a first side of said frame and comprising a first temple portion, a first hinge and a first end; a second arm connected to a second side of the frame and comprising a second temple portion, a second hinge and a second end; wherein said first temple portion has a first length and said second temple portion has a second length, wherein said first length is longer than said second length by an off-set distance and said off-set distance results in a space under the first temple portion.

2. The reading glasses of claim 1 wherein said first arm has a first end having a bladed shape that is adapted for easy insertion into the pages of a closed book having a spine and wherein the first arm has a second end pivotally coupled to the first hinge.

3. The reading glasses of claim 2 wherein said bladed shape is perpendicular to said first plane so that when the first plane is disposed against a spine of a closed book having a plurality of pages the bladed shape will remain parallel to said plurality of the pages.

4. The reading glasses of claim 1 wherein the first arm and the second arm have an extended configuration wherein they are substantially parallel to each other and a folded configuration wherein the second arm is folded under the first arm so that the second end of the second arm is in contact with said first lens and wherein the first arm remains at a substantially right angle to the first temple portion hinged end such that the first end is foldable to be parallel to the second end.

5. The reading glasses of claim 1 wherein said first hinge and said second hinge are spring hinges.

6. The reading glasses of claim 1 wherein when the first end of the first arm is inserted into said closed book said spine is disposed within said space under the first temple portion.

7. The reading glasses of claim 6 wherein when the first arm is inserted into the closed book, said first lens and said second lens remain parallel to the spine of the book.

8. The reading glasses of claim 6 wherein when the first arm is inserted into the closed book frictional forces between said pages and the first arm maintain the first arm within the book.

9. The reading glasses of claim 8 wherein when the first arm is inserted into the closed book the first lens and the second lens do not extend beyond the boundaries of the spine.

* * * * *